United States Patent
Fischer et al.

(10) Patent No.: US 10,146,937 B2
(45) Date of Patent: Dec. 4, 2018

(54) METHOD FOR ANALYZING A LOGIC CIRCUIT

(71) Applicant: Siemens Aktiengesellschaft, Munich (DE)

(72) Inventors: Bernhard Fischer, Vienna (AT); Martin Matschnig, Tulln (AT); Herbert Taucher, Moedling (AT)

(73) Assignee: Siemens Aktiengesellschaft, Munich (DE)

( * ) Notice: Subject to any disclaimer, the term of this patent is extended or adjusted under 35 U.S.C. 154(b) by 147 days.

(21) Appl. No.: 15/248,370

(22) Filed: Aug. 26, 2016

(65) Prior Publication Data
US 2017/0061124 A1 Mar. 2, 2017

(30) Foreign Application Priority Data
Aug. 31, 2015 (EP) .................................. 15183113

(51) Int. Cl.
| G06F 21/55 | (2013.01) |
| G06F 21/57 | (2013.01) |
| G06F 21/76 | (2013.01) |
| G06F 17/50 | (2006.01) |
| G06F 21/70 | (2013.01) |
| G06F 21/71 | (2013.01) |

(52) U.S. Cl.
CPC ........ *G06F 21/552* (2013.01); *G06F 17/5022* (2013.01); *G06F 17/5036* (2013.01);
(Continued)

(58) Field of Classification Search
CPC .. G06F 17/50; G06F 17/5022; G06F 17/5036; G06F 21/55; G06F 21/552;
(Continued)

(56) References Cited

U.S. PATENT DOCUMENTS 6,516,415 B1 * 2/2003 Hou .................. G06F 21/71
                                                           380/278
9,449,196 B1 * 9/2016 Purri .................. G06F 21/76
(Continued)

OTHER PUBLICATIONS

Roudier Y. et al: "SysML-Sec: A SysML environment for the design and development of secure embedded systems"; XP055249349; URL:http://perso.telecom-paristech.fr/-apvrille/docs/APCOSEC2013_ApvrilleRoudier.pdf [gefunden am Feb. 11, 2016].
(Continued)

*Primary Examiner* — Jayesh M Jhaveri
(74) *Attorney, Agent, or Firm* — Cozen O'Connor (57) ABSTRACT

A method for a logic circuit including a plurality of components and channels which are each assigned functional properties in a circuit model to simulate how the logic circuit functions, where the circuit model, in a section of the method, is expanded by mechanisms for security analysis, and where in a further section of the method, the following method steps are implemented via a simulation unit, i.e., check whether the security property of the respective component and/or the respective channel corresponds to the security requirement of the security-relevant data and generate a security risk report if it does not correspond thereto, apply a modeled attack to a component and/or to a channel, and determine a vulnerability of the security property of the respective component and/or of the respective channel to the applied attack, and if there is vulnerability of the security property, generate an attack report.

14 Claims, 4 Drawing Sheets

(52) U.S. Cl.
CPC ............ *G06F 21/577* (2013.01); *G06F 21/76* (2013.01); *G06F 17/50* (2013.01); *G06F 21/55* (2013.01); *G06F 21/554* (2013.01); *G06F 21/556* (2013.01); *G06F 21/70* (2013.01); *G06F 21/71* (2013.01)

(58) Field of Classification Search
CPC .... G06F 21/554; G06F 21/556; G06F 21/577; G06F 21/70; G06F 21/71; G06F 21/76; G06F 21/57
See application file for complete search history.

(56) References Cited

U.S. PATENT DOCUMENTS

| | | | | |
|---|---|---|---|---|
| 2007/0033419 | A1* | 2/2007 | Kocher | ................... G06F 21/10 713/193 |
| 2010/0083203 | A1* | 4/2010 | Bose | ................... G06F 17/5036 716/113 |
| 2015/0106941 | A1* | 4/2015 | Muller | ................... G06F 21/577 726/25 |
| 2015/0379269 | A1* | 12/2015 | Grawrock | ............... G06F 21/57 726/22 |

OTHER PUBLICATIONS

Loinig J. et al: "Towards formal system-level verification of security requirements during hardware/software codesign"; SOC Conference (SOCC); 2010 IEEE; pp. 388-391; XP031880663; DOI: 10.1109/SOCC.2010.5784702; ISBN: 978-1-4244-6682-5.

J. Loinig et al.: "Idea: Simulation Based Security Requirement Verification for Transaction Level Models, Engineering Secure Software and Systems", pp. 264-271, Springer-Verlag Berlin Heidelberg, 2011.

* cited by examiner

METHOD FOR ANALYZING A LOGIC CIRCUIT

BACKGROUND OF THE INVENTION

1. Field of the Invention

The present invention generally relates to the field of electronic logic circuits and, more particularly, to integrated circuits, such as Application-Specific Integrated Circuits (ASICs), Field Programmable Gate Arrays (FPGAs) and system-on-chip systems. More specifically the present invention relates to a method for analyzing a logic circuit comprising a number of components and channels for exchange of data between components, where each component and each channel is assigned functional properties in a circuit model to simulate a way in which the logic circuit functions.

2. Description of the Related Art

Logic circuits are used in numerous electrical and electronic devices or systems. Such circuits generally comprise a substrate (e.g., a semiconductor substrate) on which different circuit elements or circuit element blocks are accommodated and wired to one another. These circuit elements or circuit element blocks are also referred to as components. An integrated circuit usually consists of a number of different components, which are accommodated on a monocrystalline substrate. If all or a large part of the desired functions are implemented on one chip, this is referred to as a system-on-chip. By means of this integration, comprehensive functionalities and applications are available in the very smallest space. The rapid progress in technological development means that the possibility currently exists to accommodate complex logic circuits with a large number of components on a single semiconductor chip.

Such complex circuits are usually designed via computer-based aids. In such cases, a virtual circuit model is first created in order to simulate a desired way of functioning. In concrete terms each component (hardware components; system components that consist of hardware and software portions, etc.) is represented by a functional component model, in order to construct a circuit model of the logic circuit or of the logical system therefrom. Based on this circuit model, a functionality of the corresponding circuit is able to be checked and verified via simulation. This applies especially for a circuit model with a high degree of abstraction, which is also referred to as a high-level model. Using a high-level programming language such as C++, SystemC or System Verilog, the functional component models and circuit models of logic circuits can be captured, represented and a functional behavior of the logic circuit as well as the individual components of the logic circuit can be simulated. More specifically, in this case, e.g., runtimes and performance of the individual functional components are defined as parameters, so that the circuit model behaves during a simulation like the corresponding real circuit or behaves like a real hardware model.

An important aim in the development of complex circuits (systems) is protecting them from attacks (security attacks). In order to render such attacks more difficult or to avoid them, security measures are integrated into the design of the circuit. With these measures, security-relevant data stored or processed in the system is to be protected. In order to determine these security measures and lay them out in an optimal way, an analysis of the design is required. In this analysis, an investigation is performed to determine which components of the system can be affected explicitly or implicitly by attacks and which security measures are sensible to a given extent for a respective use case.

Usually, such an analysis occurs based on ongoing inspection and reviews of the system by a developer (architects) during a development process. The use of an "attack-tree" analysis is also known.

Because of the increasing size and complexity of logic circuits it is becoming increasingly difficult to investigate comprehensively the effects of possible attacks on the functionality and security of the circuits.

SUMMARY OF THE INVENTION

In view of the foregoing, it is an object of the invention to provide a method for performing a reliable security analysis of a logic circuit.

This and other objects and advantages are achieved in accordance with the invention by a method with by which the circuit model is expanded in a section of the method by mechanisms for security analysis such that the respective component and/or the respective channel is assigned at least one defined security property, security-relevant data is linked to at least one defined security requirement and to a security status, and such that in a further section of the method the following method steps are performed via a simulation unit, checking whether the security properties of the respective component and/or of the respective channel correspond to the security requirement of the security-relevant data and generating a security risk report if they do not, applying a modeled attack to a component and/or to a channel, determining the extent to which the applied attack is able to violate the security of the component and/or of the channel and, for a given vulnerability of the security properties, generating an attack report.

Thus, a security analysis with reports with respect to the suitability of the security properties set and with respect to the extent to which the security properties are able to be violated by an attack carried out virtually is already undertaken at the design stage based on a simulation. If, for example, there is a manipulation of data in an attacked component, this data migrates in accordance with the functionality of the circuit model through further components. For these components, the vulnerability of the security properties as a result of processing the manipulated data is also determined. If necessary, to optimize the system, additional security measures can be subsequently introduced or removed.

This insures that all consequential effects of manipulated data are recognized and that the logic circuit is sufficiently robust in relation to all modeled and applied attacks.

With this method, attacks for which the simulation usually takes a great deal of time, such as the reconstruction of cryptographic encryption algorithms, are also able to be checked. In the present method, it must merely be determined whether the modeled attack has a sufficient potential to overcome a defined security property of the attacked component. If it has, a given vulnerability is confirmed via a generated attack report.

In addition, deviations between the security requirements of the data and the security properties of the components are already recognized and notified in the design phase of the circuit model by the simulation unit.

It is advantageous for each component and each channel to be expanded by its own simulation unit. This unit then implements the testing steps during a simulation for the respective channel or for the respective component and generates a corresponding report if security risks are recognized. In this case, it is sensible for event data to be generated as a result of an applied attack. This event data describes any manipulation of data that might have occurred, through which a more precise analysis is made possible.

In a further advantageous embodiment of the invention, probability data is generated to determine the vulnerability of the respective security property. The probability of the attack being successful is then specified in the attack report. In addition, the probability data can provide information about how long the attack is likely to last before the security property involved is violated. Consequently, risk data is sensibly derived from the probability data for assessing the respective security property. It is able to be established in a simple manner based on this risk data whether a security property must be expanded or can be reduced. If, for example, a tolerable risk level is defined for the circuit to be developed, a reconciliation of the risk data with this risk level is undertaken. If the established risk exceeds the specification for a component, the security property must be expanded. Conversely, an exaggerated security property is also recognized by this method.

A simple development of the invention makes provision for an attack to be selected from a previously created library. This means that a new attack does not have to be created for each use case. Instead, the attack is modeled by simply selecting it from the library and adapting attack parameters where necessary. Here, it is advantageous for each attack to be assigned an attack potential, an attack type and/or an attack time trigger. Based on these attributes, an attack is able to be selected in a simple manner or able to be modeled in a modified variant.

In order to further increase the efficiency of the present method, there is provision in an embodiment for an attack graph with a number of graph nodes to be modeled and for each graph node to correspond to an attack that is applied to a particular component and/or to a particular channel. Thus further method steps are added in which additional attacks are applied in accordance with the modeled attack graphs to individual components or channels, and where the capability of the respective security properties of the component involved is in turn determined. The necessary steps for adapting the security measures can be derived from the effects of the multiple attacks determined.

A consequential advantage is when a number of attack graphs are linked together, so that one attack graph is executed as a function of the progress of the execution of another attack graph. Thus, the complexity of the attack scenarios able to be applied is further increased. With this increasing complexity, the security of the circuit to be developed also increases in relation to any form of attacks.

For the circuit model of the logic circuit, there is expediently provision for the model to be formed as a high-level model, especially as an "electronic system level model". During different steps of a design process for a logic circuit, especially for ASICs, different circuit models are created with different levels of abstraction. With these circuit models, different functionalities of the logic circuit can also be tested. At the beginning of a design process, a high-level model or especially an electronic system-level model, or ESL model, of the logic circuit is designed. With this model, on the one hand functionalities, algorithms etc. of the individual components as well as the logic circuit can be modeled or functional models of components and circuits created and, on the other hand, the effects of attacks and the vulnerability of the security properties set can be efficiently tested.

In addition, it is expedient for an integrated circuit, i.e., an Application-Specific Integrated Circuit (ASIC) or a system-on-chip to be provided. An integrated circuit can consist of a combination of a number of electrically connected electronic components—mostly semiconductor components (e.g., diodes or transistors) and/or further active and passive components (e.g., resistors). There are applications for integrated circuits in many areas with high security requirements, such as in the construction of processors, controllers, or data memories.

A specific form of integrated circuits is Application-Specific Integrated Circuits (ASICs) that are currently used in many different electronic devices. In an ASIC, the functionality of the logic circuit is already uniquely defined during the development and manufacturing and is no longer able to be changed thereafter. That means that an ASIC has a strict dependence on the data to be processed and the logic implemented in an ASIC has a close relationship with the function or functions to be performed. Therefore, it is especially important with ASICs for a system security to already be established and tested in the design and development phase in a simple and cost-effective way, whether for example risk specifications demanded or desired are adhered to.

A further form of an integrated circuit is the system-on-chip system or one-chip system. In this case, there is an integration of all or of a large part of the functions of a system (e.g., embedded computer). A system is deemed to be a combination of different components such as logic circuits, timing, microtechnical sensors, memory units, processors, interfaces, or bus system etc., by which a specific overall functionality is provided. The method is especially suitable for these types of variants, because with conventional methods, as a result of the increasing system size and complexity, only more inadequate evaluations of the security situation are possible here.

In a further expedient embodiment, a Field Programmable Logic Gate Array is provided as the logic circuit. With such Field Programmable Logic Gate Arrays or FPGAs, by a specific configuration of internal structures (e.g. gates or logical blocks) different circuits (from simple circuits, such as a counter circuit through to highly complex circuits such as a microprocessor) can be realized. FGPAs are used in all areas of digital technology, especially in areas where it is a matter of fast signal processing and an ability to modify the circuit flexibly. By comparison with other logic circuits, especially ASICs, FGPAs have the advantage of lower development costs and very short implementation times. A particular advantage of FGPAs is that they are able to be reconfigured and thus a logic circuit realized with an FGPA is easily able to be corrected and, if necessary, able to be expanded with security mechanisms.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained below by way of examples, which refer to the enclosed figures. In the figures, in which.

DETAILED DESCRIPTION OF THE EXEMPLARY EMBODIMENTS

Figure 1:
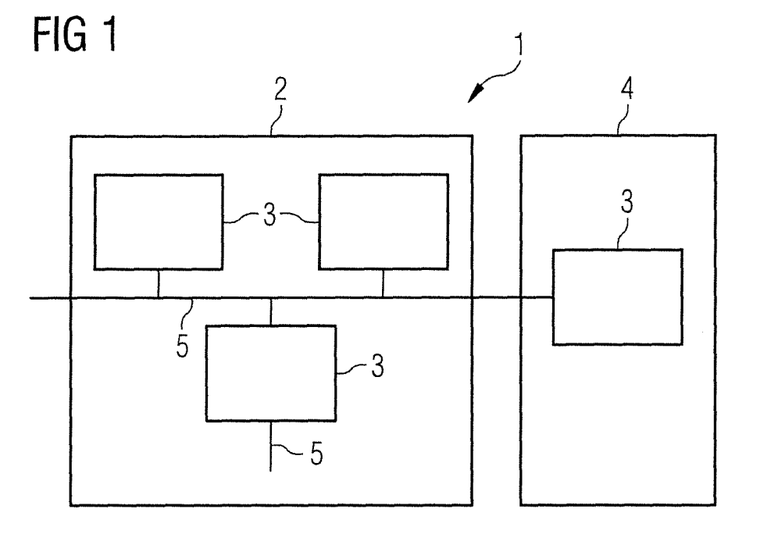
FIG. 1 shows a virtual circuit model of a logic circuit in accordance with the invention.

The starting point of the present method is a virtual circuit model 1 in a suitable computer-based simulation environment. The circuit model 1 emulates a logic circuit, such as a system-on-chip or ASIC and is described, for example, in a design or development phase as a high-level model (e.g. ESL model) at system level with a high-level programming language such as SystemC.

In the example in accordance with FIG. 1, the virtual circuit model 1, in a first module 2, has three exemplary components 3 and, in a second module 4, has one component 3. These components 3 can, e.g., be hardware components (e.g., electronic circuit elements) or system components (e.g., logic circuits, or components with hardware and software portions). For design or development or for the simulation of the circuit model 1 of the logic circuit, such as to test the functionality of the logic circuit for a predetermined use case, each component 3 is created as a functional model (likewise as a high-level model in a programming language, such as SystemC). With the aid of the functional component models, a functional behavior of the respective component 3 can be simulated. In this case, run times and/or performances are predetermined as parameters that can be set for each component 3. During a simulation, there is then simulated data processing in accordance with these settings, with run times and performances that approximately correspond to the real logic circuit.

The components 3 are interconnected and connected to external components (not shown) by channels 5. As a rule, a suitable bus is provided for this purpose.

Figure 2:
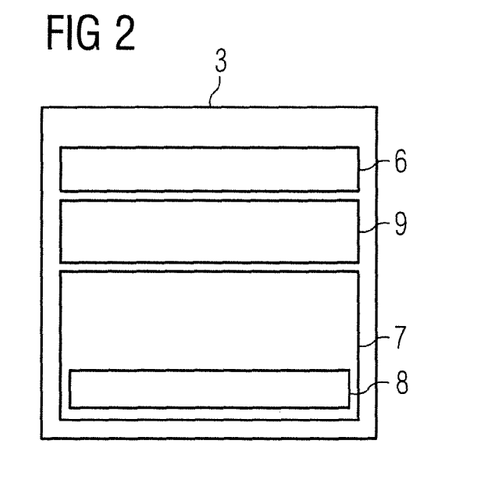
FIG. 2 shows the expansion of a component or of a channel in accordance with the invention.

A component 3 expanded with the inventive attributes is shown in FIG. 2. The component 3 is assigned defined security properties 6. Security concepts known in data processing, such as confidentiality, integrity, authenticity and non-repudiation, are used, for example, in the determination of the security properties 6.

The degree of confidentiality, integrity, authenticity and/or non-repudiation with which the respective component 3 processes data is thus determined with the security properties 6, for example. Thus, a classification of each individual component 3 with respect to its security properties 6 for protection of security-relevant data is undertaken. The same applies for a channel 5. Here, the degree of confidentiality, integrity, authenticity and/or non-repudiation with which security-relevant data is transmitted by the respective channel 5 is also determined with defined security properties 6. For example, the security properties 6 are defined such that, in the simulation environment, each component 3 and each channel 5 is linked to security parameters. The respective security parameter then defines, as a number between 0 and 10, how high the degree of confidentiality and/or integrity and/or authenticity and/or non-repudiation etc. is.

To process security-relevant data, the component 3 comprises suitable memory facilities 7. Here, defined security requirements 8 are determined for the security-relevant data. In particular, this involves determinations as to the degree of confidentiality, integrity, authenticity and/or non-repudiation that is demanded. In this way, the security-relevant data to be processed via the component 3 or to be transmitted via the channel 5 is also classified. The security requirements 8 are also able to be determined in the simulation environment, e.g. by security parameters, which are linked to the data.

In addition, all security-relevant data is linked to a security status. This security status provides information about whether the corresponding data is still trustworthy, for example, or whether there is a probability that a data manipulation has already occurred.

Each component 3 of the circuit model 1 is expanded with a simulation unit 9. This initially tests whether the security status and the security requirements 8 of the data, which is processed in the respective component 3, corresponds to the security properties 6 of this component 3. For example, the data demands a high level of confidentiality, which is why this has encryption as a security requirement 8. If such data is then processed or forwarded unencrypted, there is no match between the security requirements 8 of the data and the security requirements 8 of the component 3 or of the channel 5 involved. As a result of such a non-correspondence, a security report is generated by the simulation unit 9 and is conveyed to an output unit.

An attack 10, 11, 12 on a component 3 or a channel 5 is modeled and applied in a further method step. In this case, for example, the simulation unit 9 of a component 3 selects an attack 10, 11, 12 from a previously created library, shown in FIG. 3.

Figure 3:
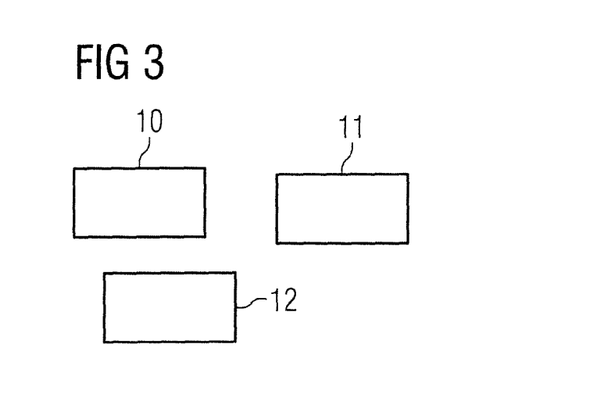
FIG. 3 shows a library with different attacks.

An attack 10, 11, 12 has different attack properties, which are derived, for example, from the classifications confidentiality, integrity, authenticity and non-repudiation. For example, the attack strength is defined as an attack potential. A further identification relates to the attack type, for example, key reconstruction. To define an attack point, an attack 10, 11, 12 is assigned an attack trigger. The attack trigger specifies to the simulation unit 9 the respective component 3, when an attack is initiated (activated), through which the attack 10, 11, 12 is made immediately or only later, depending on configuration.

The essence of the present invention is that a triggered attack 10, 11, 12 interacts during a simulation with the virtual circuit model 1. A respective attack 10, 11, 12 in this case has access to data, where manipulation possibilities exist. In specific terms, these manipulation possibilities depend on which security properties 6 the component 3 involved or the channel 5 involved have and which attack properties the attack 10, 11, 12 directed to this component 3 or this channel 5 has.

For example, an attack 10 with properties "key reconstruction" as attack type, "high" as attack potential and "immediate" as attack time trigger is selected from the library. These properties are able to be set as attack parameters in the simulation environment, for example.

After selection of this attack 10, this is immediately applied to an assigned component 3. If this component has an encryption property, of which the degree of strength is smaller than that of the attack potential (e.g., "medium"), then the attack 10 obtains access to the data processed in this component 3 and can manipulate the data. Accordingly, the security status of this data is modified and an attack report with result data is generated and output to an output unit. In this case, there is the option of specifying a probability of the attack being successful. Corresponding probability data is then specified in the security status and in the attack report, e.g., that the data has been manipulated with a probability of 70%.

In addition, a code for the corresponding attack, a code for the component involved and a point in time or a duration for carrying out the attack, are output as result data. The option also exists to calculate different probability data for different durations. In such cases, it is calculated, based on the security parameters of the component 3, the data and of the attack 10, how long the attack would have to last so that there would be a specific probability of a violation resulting. Consequently, risk data can be derived from the probability data. For example, as a result of an attack simulation a risk value (security risk number) is output for each component 3 and each channel 5. These risk numbers then give information about how vulnerable the components 3 and channels 5 are in relation to the applied attacks 10, 11, 12. A comparison with the risk level demanded then immediately shows where the security measures have weak points or where unnecessary security measures might possibly have been set. For example, it can be shown by simulation of a use case that the execution of cryptographic functions to a lesser extent is more sufficient than originally assumed for protecting the system.

Figure 4:
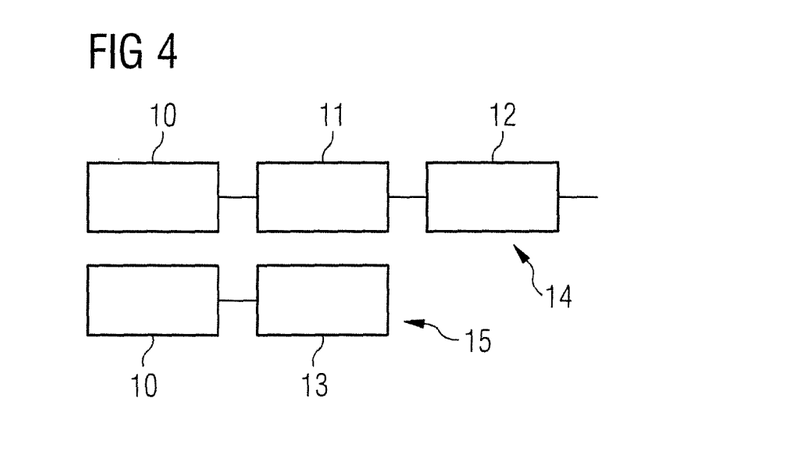
FIG. 4 shows plots of different attack graphs.

In an embodiment of the invention, by selecting and combining attacks 10, 11, 12, 13, one or more attack graphs 14, 15 can be formed, as shown in FIG. 4. Here, for example, the execution of an attack graph 14 depends on the ending of another attack graph 15. The resolution of an attack graph 14 is oriented in such cases to a predetermined sequence of attacks 10, 11, 12 or 10, 13 on the circuit model 1.

Figure 5:
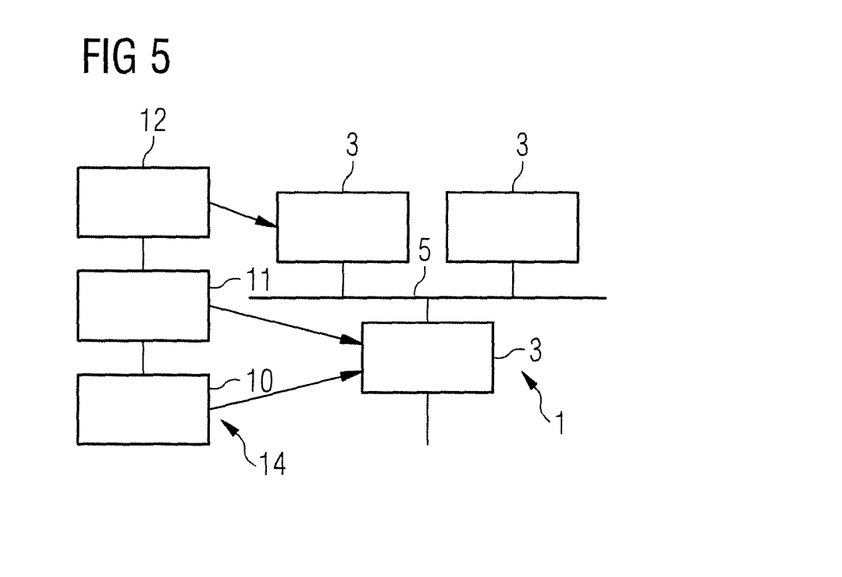
FIG. 5 shows plots of attack graphs with attacks on different components of a circuit model.

In specific terms, a simulation of a mapping of an attack graph 14 to the circuit model 1 occurs during a simulation, as is shown in FIG. 5. In such cases an attack 10, 11, 12, 13 or a number of attacks 10, 11, 12, 13 can be applied to a component 3 or to a number of components 3. In this way, the option is created to apply different use cases to the virtual circuit model 1. Such use cases can, e.g., be created with what is called the task graph method (Platform Architect from Synopsis).

Different attack graphs 14, 15 can be used for the simulation and analysis of the circuit model, where, by suitable combination of attacks 10, 11, 12, 13, security gaps can be revealed for the simulated use case. For example, with an attack 10 a task can test a data packet via MAC checking and if necessary request a new packet.

The simulation unit 9 in the respective component 3 monitors the modeled circuit model 1 and notifies corresponding security violations by corresponding reports via an output unit. Thus, data and data quality can be traced and recorded during a simulation. This allows the tracing back of security-relevant events. In addition, the effects of manipulated data on the circuit model 1 are established.

Figure 6:
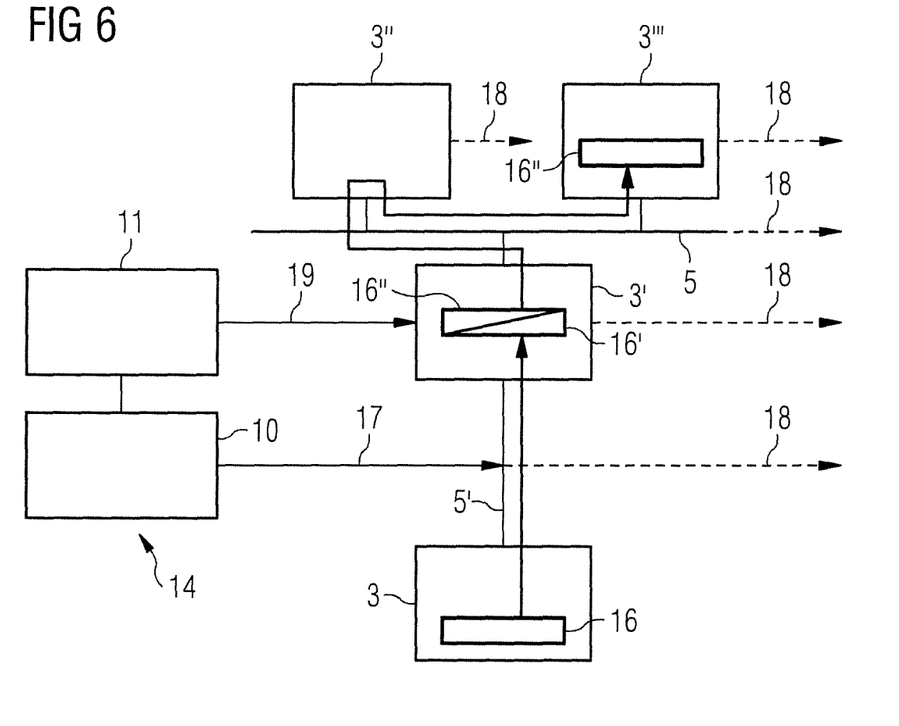
FIG. 6 shows a plot of an attack graph with attacks on different components of a circuit model and processing of security-relevant data in accordance with the invention.

In an exemplary simulation depicted in FIG. 6, confidential data 16 is manipulated by attacks 10, 11'. The circuit model 1 in this case consists of four components 3, 3', 3", 3''', where the first component 3 is connected to a second component 3' via a first bus and where the second component 3' is connected to a third and a fourth component 3", 3''' via a further bus.

The initial effect of a first attack 10 is the reconstruction 17 of a key, with which the first bus was previously protected. This means that the data 16 conveyed through this channel 5' is decrypted. Decrypted data 16' is already reaching component 3'. The effect of this simulation process is that the security status connected with the data 16' changes and that a corresponding attack report 18 is output. In this report, it is stated, for example, that the data 16 conveyed by the the channel 5' has been decrypted at a specific point in time.

By a second attack 11, which in accordance with the predetermined attack graph 14 is applied to the second component 3', there is a manipulation 19 of the decrypted data 16'. Consequently, the manipulated data 16" is conveyed via the further bus initially into the third component 3" and finally into the fourth component 3'''. In this case, an attack report 18 is generated and output via the respective simulation unit 9 as the data passes each component 3", 3''' and each channel 5. This enables the entire system to be analyzed with respect to the causes and effects of manipulated data 16".

Thus, in accordance with the invention, it is possible to establish whether components 3, 3', 3", 3''' exhibit different behavior through manipulated data. Thus, by what-if analyses or explorative use of attack graphs and security measures, the design and operation of a logic circuit is optimized.

A method for analyzing a logic circuit comprising a plurality of components (3, 3', 3", 3''') and channels (5, 5') for interchanging data between said plurality of components (3, 3', 3", 3'''), wherein, for a simulation of a way in which the logic circuit functions, each component (3, 3', 3", 3''') and each channel (5, 5') is assigned functional properties in a circuit model (1), which in a section of the method, is expanded by mechanisms for security analysis such that a respective component (3, 3', 3", 3''') or a respective channel (5, 5') is assigned at least one defined security property (6) and such that security-relevant data (16, 16', 16") is linked to at least one defined security requirement (8) and to a security status.

Figure 7:
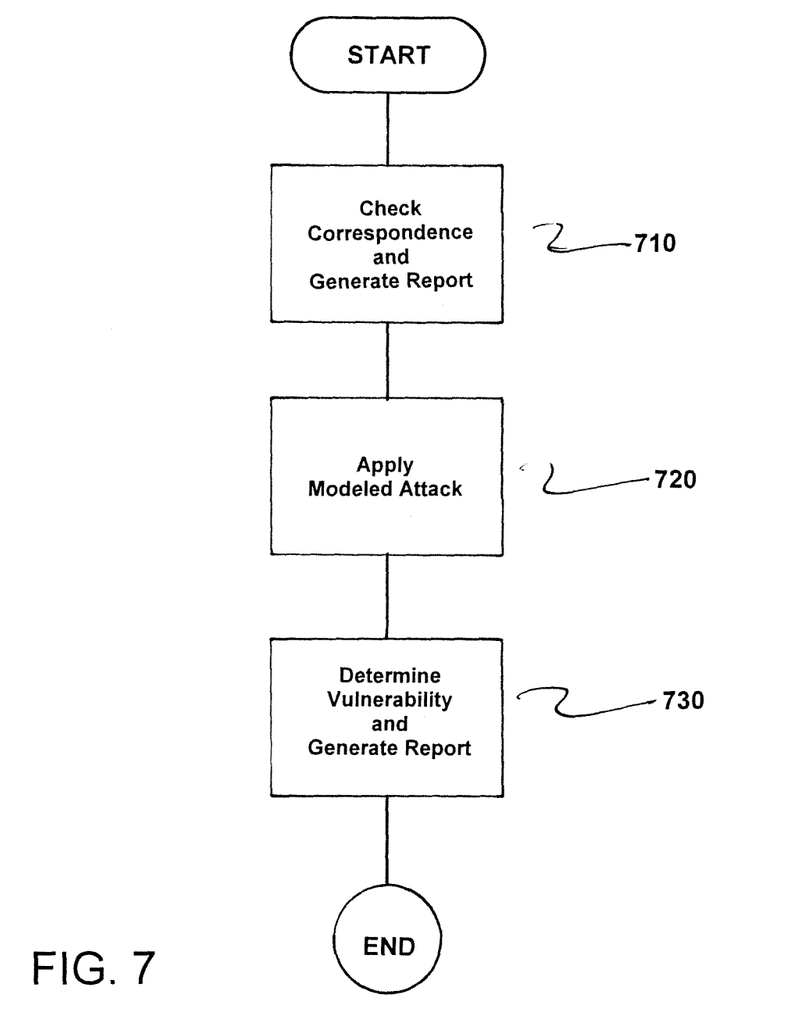
FIG. 7 is a flowchart of the method in accordance with the invention.

In a further section of the following method steps are performed via a simulation unit (9). Thus, a check is performed to determine whether a security property (6) of at least one of the respective component (3, 3', 3", 3''') and the respective channel (5, 5') corresponds to a security requirement (8) of the security-relevant data (16, 16', 16''') and a security risk report is generated if the security property does not correspond the security requirement (8) of the security-relevant data (16, 16', 16"), as indicated in step 710.

Next, a modeled attack (10, 11, 12, 13) is applied to at least one of a component (3, 3', 3", 3''') and a channel (5, 5'), as indicated in step 720.

Next, a vulnerability of the security property (6) of at least one of the respective component (3, 3', 3", 3''') and the respective channel (5, 5') to the applied modeled attack (10, 11, 12, 13) is determined and an attack report (18) is generated if a vulnerability of the security property (6) of at least one of the respective component (3, 3', 3", 3''') and the respective channel (5, 5') to the applied modeled attack (10, 11, 12, 13) exists, as indicated in step 730.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for analyzing a logic circuit comprising a plurality of components expanded by a respective simulation unit and channels expanded by a respective simulation unit for interchanging data between said plurality of components, wherein, for a simulation of a way in which the logic circuit functions, each component and each channel is assigned functional properties in a circuit model, which in a section of the method, is expanded by mechanisms for security analysis such that a respective component or a respective channel is assigned at least one defined security property and such that security-relevant data is linked to at least one defined security requirement and to a security status, and such that in a further section of the method the following method steps are performed via at least one of (i) a respective simulation unit of the respective component and (ii) a respective simulation unit of the respective channel:

checking to determine whether a security property of at least one of the respective component and the respective channel expanded by the respective simulation unit corresponds to a security requirement of the security-relevant data and generating a security risk report if the security property does not correspond the security requirement of the security-relevant data;

applying a modeled attack to at least one of the respective component and the respective channel expanded by the respective simulation unit; and determining a vulnerability of the security property of at least one of the respective component and the respective channel expanded by the respective simulation unit to the applied modeled attack and generating an attack report to protect the logic circuit from attacks if the vulnerability of the security property of at least one of the respective component and the respective channel expanded by the respective simulation unit to the applied modeled attack exists.

2. The method as claimed in claim 1, wherein event data is generated as the result of the applied attack.

3. The method as claimed in claim 1, wherein event data is generated as the result of the applied attack.

4. The method as claimed in claim 1, wherein probability data is generated to determine the vulnerability of the respective security property.

5. The method as claimed in claim 4, wherein risk data for evaluating the respective security property is derived from the probability data.

6. The method as claimed in claim 1, wherein an attack is selected from a previously created library.

7. The method as claimed in claim 1, wherein each attack is assigned at least one of an attack potential, an attack type and an attack time trigger.

8. The method as claimed in claim 1, wherein an attack graph with a number of graph nodes is modeled, each graph node corresponding to an attack that is applied to at least one of a specific component and a specific channel.

9. The method as claimed in claim 8, wherein a plurality of attack graphs are linked to one another, such that one attack graph is executed as a function of a progress of the execution of another attack graph.

10. The method as claimed in claim 1, wherein the circuit model of the logic circuit is formed as a high-level model.

11. The method as claimed in claim 10, wherein high-level model is an electronic system-level model.

12. The method as claimed in claim 1, wherein the logic circuit comprises an integrated circuit.

13. The method as claimed in claim 12, wherein the integrated circuit is one of an Application-Specific Integrated Circuit or a system-on-chip.

14. The method as claimed in claim 1, wherein the logic circuit comprises a Field Programmable Gate Array.

\* \* \* \* \*